Sept. 25, 1962  A. G. THOMAS  3,055,273
ANTI-BACKLASH DEVICES
Original Filed June 14, 1954  3 Sheets-Sheet 1

Fig. 1

INVENTOR.
Albert G. Thomas

Sept. 25, 1962  A. G. THOMAS  3,055,273
ANTI-BACKLASH DEVICES
Original Filed June 14, 1954  3 Sheets-Sheet 2

Fig. 2.

Albert G. Thomas  INVENTOR

Sept. 25, 1962 A. G. THOMAS 3,055,273
ANTI-BACKLASH DEVICES
Original Filed June 14, 1954 3 Sheets-Sheet 3

INVENTOR.
Albert G. Thomas

United States Patent Office 3,055,273
Patented Sept. 25, 1962

3,055,273
ANTI-BACKLASH DEVICES
Albert G. Thomas, Charlottesville, Va., assignor to Industrial Controls Corporation, Chattanooga, Tenn., a corporation of Tennessee
Continuation of application Ser. No. 436,653, June 14, 1954. This application Nov. 10, 1958, Ser. No. 773,543
18 Claims. (Cl. 90—22)

This invention relates to a method and means for eliminating backlash and more particularly is directed to electro-mechanical apparatus which automatically compensates for variable backlash in gear systems, screw feeds, drives and other devices of various kinds.

It has long been known that backlash is a troublesome factor in mechanisms such as lathes, milling machines, indexing machines, and in numerous machine tools, instruments, and other related devices which require a high degree of accuracy in operation. Prior efforts to eliminate backlash troubles have not produced satisfactory results since, even if previous backlash compensating devices are adjusted to overcome some of the difficulty, the trouble soon reappears, particularly after a little use. There have been other difficulties such as excessive friction, limited load-carrying ability, as well as additional limitations in earlier anti-backlash devices.

In order to overcome the above and other faults of previously known anti-backlash devices, it is an object of the present invention to provide an automatic backlash compensating device or system which can be applied to milling machines and other machine tools or devices of any suitable kind.

Another object is to provide backlash compensating means which need little or no adjustment over extended periods.

A further object is to provide automatic backlash compensating means which compensate for any degree of backlash and for variations or changes of the degree of backlash.

Still another object is to provide an electro-mechanical backlash compensating system which may be readily applied to machine tools or other devices.

These and other objects and advantages of this invention will be more apparent upon reference to the following specification, claims and appended drawings, in which:

Figure 1:
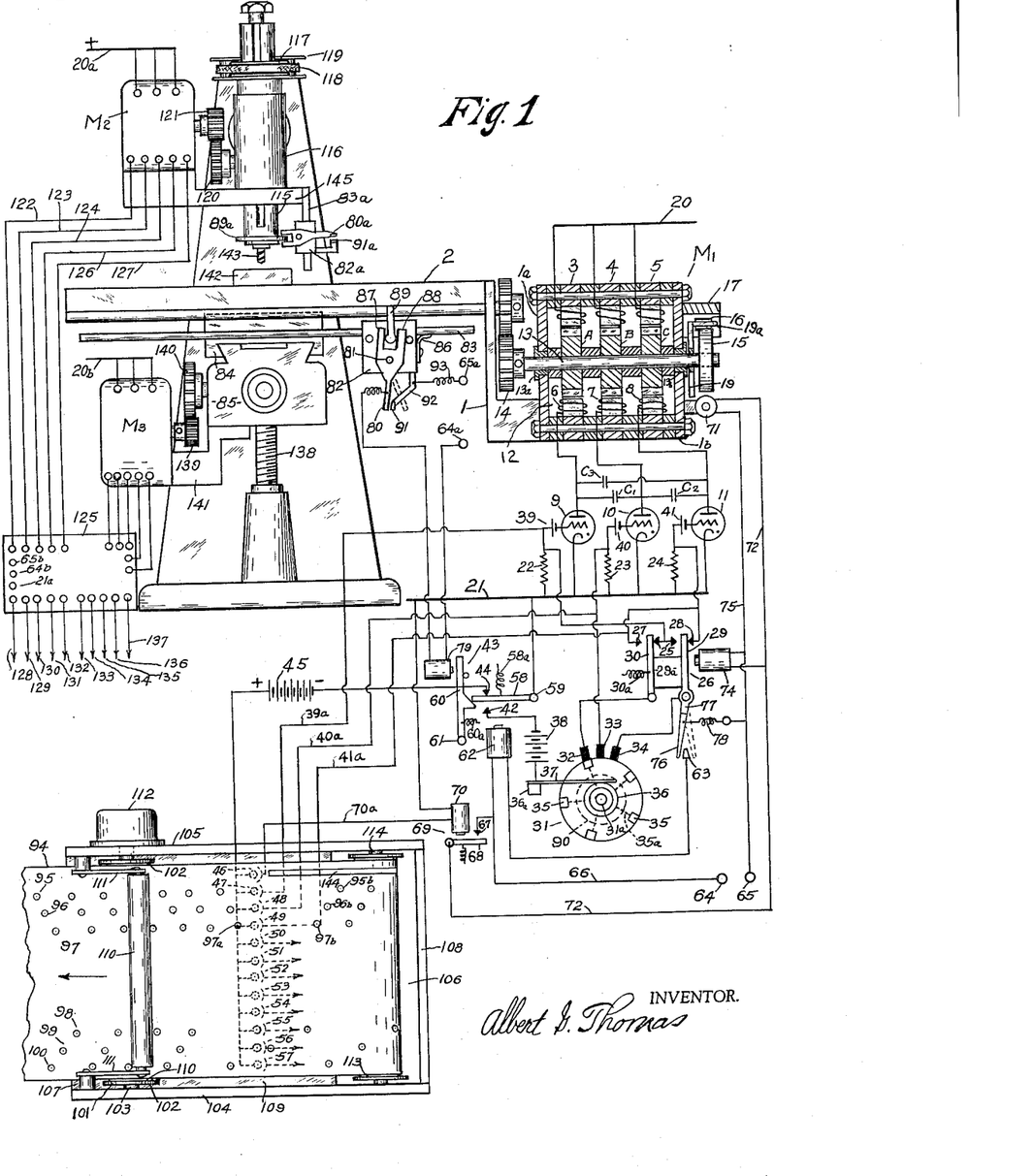
FIGURE 1 is a front elevation of a milling machine having attached step feed motors, one of which is shown with parts in section, and anti-backlash means including electrical circuits.

In FIGURE 1 motor $M_1$ is bolted or screwed to bracket 1 which is in turn screwed to the right end of table 2 of a milling machine. Motor $M_1$ is similar to the motor described in my U.S. Patent No. 2,774,922 and is constructed to rotate in steps. The stator comprises three annular sections 3, 4, 5, of laminated silicon steel or other magnetic material and these sections have uniformly spaced teeth or poles which are periodically magnetized by current passing through windings 6, 7, 8 sequentially. These windings may be supplied current by respective thyratrons 9, 10, 11 connected as shown.

Rotor 12 of motor $M_1$ has three sections A, B and C axially aligned with the respective associated stator sections 3, 4, and 5, each rotor section having the same number of teeth or poles as the associated stator section and similarly spaced so that the rotor teeth may be rotated into circumferential alignment or register with the associated stator teeth. The circumferential width of the rotor teeth may be equal to the circumferential width of the stator teeth and the width of the gaps between teeth is substantially equal to the tooth widths. The teeth of the three stator sections or phases are in alignment. The three rotor sections or phases are attached to a shaft 13 by keys or other suitable means and are angularly displaced or phased so that the leading edges of the teeth of any one phase overlap the trailing edges of the teeth of the associated stator teeth of that phase when the rotor and stator teeth of the preceding phase are in register. Therefore, one phase will always be in a position to start the motor, and reversal of direction of rotation can be accomplished by reversing the energizing current connections to the first and third phases. It is obvious that the rotor teeth may be in alignment and the stator teeth of the three sections may be positionally phased.

It will be seen that if the three stator windings 6, 7 and 8 are sequentially energized in that order, the motor will revolve in steps in one direction and if the order of energization is 8, 7, 6, the motor will rotate in the opposite direction, in steps. When the winding of any stator unit or section is supplied with current, magnetic flux is produced in the stator teeth and in the associated rotor teeth of that section, producing magnetic attraction between those stator and rotor teeth or poles. The windings may be placed around each stator pole or every other pole of any phase to produce alternate north and south poles in the stator teeth, or the teeth may be wound in groups.

Figure 6:
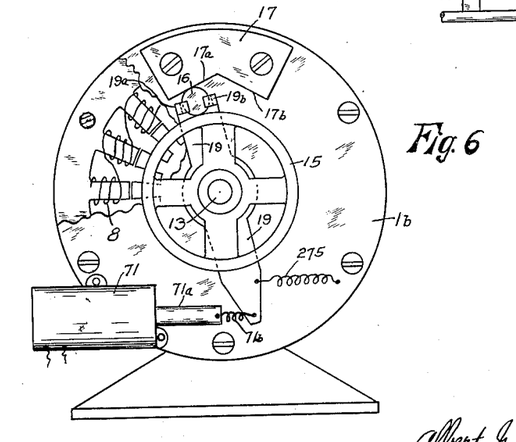
FIGURE 6 is an end view of motor $M_1$ of FIGURE 1 with the end wall partly broken away to show the rotor and stator teeth.

Shaft 13 is rotatably supported in bearings 13a and 13b in end bells 1a and 1b and carries gear 14 at one end and a hardened disc 15, which is keyed or otherwise attached to the shaft at the other end. As shown in FIGURES 1 and 6, the disc cooperates with a hardened roller 16 and with a hardened cam 17 fastened to end bell 1b to allow rotation of the disc and rotor in only one direction for either setting of the brake or lock. Lugs 19a and 19b extend outwardly from an arm 19 and are bent over at the ends to cage the roller between the lugs and the flat upper portion of the arm. This arm is placed between wheel brake or disc 15 and end bell 1b and is supported on shaft 13 by means of a suitable bearing in the arm, being rotatable around the shaft through an angle which is determined by the points at which roller 16 makes contact with cam surface 17a in one case and with cam surface 17b in the other case. A solenoid plunger 71a is preferably attached to the lower end of arm 19 by a stiff spring 71b while a tension spring 275 is attached to the arm and to end bell 1b.

When, as shown in FIGURE 6, solenoid 71 is deenergized so that its plunger 71a is extended, spring 275 urges the arm to rotate about shaft 13 in a counter clockwise direction so that lug 19b presses roller 16 against cam surface 17a and the rim of brake wheel 15. The angle of this cam surface is so chosen that the roller will be pinched between that surface and the brake wheel to lock the latter against rotation in a counter clockwise direction but allows substantially free rotation in the opposite direction. When it is desired to permit rotation of the rotor and attached brake wheel 15 in a counter clockwise direction the solenoid is energized by current through conductors 72 and 75 so that plunger 71a is pulled into the solenoid, swinging arm 19 through a clockwise angle until lug 19a forces roller 16 against cam surface 17b and the rim of brake wheel 15, thus locking the wheel and rotor against rotation in a clockwise direction but allowing substantially free rotation in the opposite direction. When the solenoid is deenergized the spring 275 pulls arm 19 back to the position shown, with roller 16 held in contact with cam surface 17a and brake wheel 15.

The purpose of the brake is to prevent oscillation of the rotor about aligned or in-register relative positions of the stator teeth and associated rotor teeth, for any energized phase. If the brake is not used, the operation of the step motor is very erratic, since, when a succeeding phase is energized, the rotor may be swinging forward or in reverse direction so that the effective rotor torque may be increased in the first case and may be virtually cancelled in the latter case. The result is that operation of the motor is very unreliable, especially at the lower speeds. When the brake is used, however, the operation is reliable and smooth, since backswing of the rotor is prevented. In other words, the rotor is held by the brake in its most advanced position for each step, for either direction of rotation.

The positive line 20 of a motor-generator, rectifier, or other direct current source is connected to one end of each of the windings 6, 7, and 8. The other ends of these windings are connected, respectively, to the anodes of thyratrons 9, 10 and 11. Suitable condensers C1, C2, C3 are connected between the anodes of these thyratrons to cause extinction or quenching of any conducting thyratron when any other of the three thyratrons is fired. Bias batteries or other potential sources 39, 40, 41 are connected between the grids of the thyratrons and negative line 21 which is connected to the negative terminal of the current source. These bias sources are connected to negative line 21 through resistors 22, 23 and 24 as shown, normally biasing the thyratron grids negatively. The filaments or cathodes of the thyratrons are connected to negative line 21. The middle contacts 25 of a double-pole double-throw reversing switch or relay 26 are connected to the positive or high potential end of resistor 22. The outer contacts 27 and 28 are connected to the high potential end of resistor 24. The relay or switch arms 29 and 30 are insulated one from the other by attached intervening block 29a of plastic material or the like and are normally held against one of the double contacts 25, and contact 27, respectively, by means of a tension spring 30a attached to the arm 30 and to the relay frame. The motor M1 rotates in forward direction when the switch or relay is in this position and commutator 31 is rotated in a counter clockwise direction to cause commutator bars 35 to sweep under brushes 34, 33, and 32 in that order.

The brushes 32, 33, and 34 are connected, respectively, with relay arm 30, the positive potential end of resistor 23, and with relay arm 29. When any commutator bar or contact 35 touches a brush 32, 33, or 34, current from source 38 passes through resilent brush 37, slip ring 36, the bar 35, the connected brush, and through the connected resistor 22, 23 or 24 and so back to the negative terminal of source 38, assuming that magnet coil 62 is energized to pull relay arm 58 down against contact 42. Since the potential of source 38 is higher than the negative biasing potentials of bias sources 39, 40, 41, the connected thyratron 9, 10, or 11 will be fired. Assuming that coil 62 is energized and that coil 74 is not energized, it will be seen that the commutator bars 35 connected to slip ring 36 will intermittently connect brushes 34, 33, and 32 into circuit with current source 38 and resistors 22, 23 and 24 in that order, since commutator 31 is being rotated in a counter clockwise direction. This causes thyratrons 9, 10, and 11 to be fired in that sequence, producing forward rotation of motor M1, or rotation in a clockwise direction as seen in FIGURE 6. In that case solenoid 71 is not energized and spring 275 holds roller 16 against cam surface 17a. The condensers C1, C2, C3, in conjunction with the impedances of the motor windings 6, 7, 8, cause any conducting thyratron to be extinguished when any other of the three thyratrons is fired.

The relay 29—30 is shown in reversing position, with coil 74 energized. In this case, the commutator bars 35 close circuits to resistors 24, 23, and 22 in that sequence, causing thyratrons 11, 10 and 9 to be fired in that order, producing reverse rotation of motor M1. In that case solenoid 71 (FIGURE 6) is energized to swing arm 19 clockwise until roller 16 strikes cam surface 17b.

Commutator 31 comprises a plastic or other insulating disc having equally spaced contacts or bars 35 imbedded circumferentially about the disc. These bars are electrically connected with slip ring 36 which is preferably insulated from the shaft 31a projecting from a driving motor 90. Brushes 32, 33, and 34 are suitably supported and are connected, respectively, with relay arm 30, with resistor 23 and the positive terminal of bias source 40, and with relay arm 29. The conductors 35a connecting bars or contacts 35 with slip ring 36 may be imbedded in the plastic disc. As shown, the elements 35 are arcuately spaced a greater distance than the arcuate total spacing of the brushes. The dimensions should preferably be arranged so that successive contact of the elements 35 with the brushes occur for equal angular displacements of the commutator. Brush 37 comprises a resilient strip of metal and is in contact with slip ring 36. This brush is fastened to an insulating block 36a which is suitably supported on the commutator framework (not shown).

Brush 37 is electrically connected to the positive terminal of battery or other current source 38, the negative terminal of which is connected to a contact 42. As previously stated, the potential of source 38 is sufficiently higher than the potentials of bias sources 39, 40, 41, to cause firing of the thyratrons as described. It is obvious that, when relay arm 58 is touching contact 42 and the commutator is rotated, a sequence of current pulses will be passed through resistors 22, 23, 24 in a direction to raise the potentials of the thyratron grids sufficiently to fire these thyratrons in sequence, the order of firing depending upon the position of relay arms 29—30.

A latching relay 43 has the contact 42 described and also has a contact 44 against which the relay arm 58 is normally held by a relay spring 58a. Contact 44 is electrically connected with the negative pole of a battery or other current source 45. The positive pole of this battery is connected to the anodes of photocells 46, 47, 48, 49, 50, 51, 52, 53, 54, 55, 56 and 57 which are shown in alignment but which may be staggered if desired.

Relay armature 58 may have suitable contacts and is pivoted at 59, being normally held against contact 44 by a spring. A latch 60 is pivoted at 61 and is normally held in the position shown, against a stop, by means of a spring 60a. When relay coil 62 is energized by current, armature 58 is pulled down against contact 42 and is held in that position by latch 60. One terminal of coil 62 is connected to a narrow contact 63 and the other terminal is connected by a conductor 66 to an A.C. or D.C. power terminal 64, the other cooperating power terminal being shown at 65. Conductor 66 is also connected to a contact 67 adapted to be struck by armature 68 of a relay 69, when relay coil 70 is energized with current. This may be a sensitive relay with coil 70 having one terminal connected to the cathode of photocell 46, and the other terminal connected to negative line 21. Armature 58 is also connected to negative line 21 and armature 68 is connected to a terminal of solenoid 71 by a conductor 72 which is also connected to a terminal of coil 74 of relay 26. The other terminal of this coil is connected to a conductor 75 which is connected with the remaining terminal of solenoid 71 and to power terminal 65.

A contact arm 76 having a narrow tip is connected to relay arm 29 by means of a Bakelite or other insulating element 77. Arm 76 is connected with conductor 75 by means of a flexible conductor 78. Latch 60 is made of steel or other magnetizable metal and is normally held against a stop by spring 60a. When, however, relay coil 79 is energized, latch 60 is pulled over by the magnetic action of the coil, and armature 58 is released so that its spring 58a quickly pulls it against contact 44. One terminal of coil 79 is connected to power terminal 64a which is connected to power terminal 64. The other terminal of coil 79 is flexibly connected to a contact arm 80 pivoted at 81 to an insulating block 82 of Bakelite or other insulating material. (See FIGURE 3.) This block is slidable on a rod 83 which is screwed or otherwise fastened to a saddle 84 which is slidable on knee 85 at right angles to rod 83. A strip type spring 86 may be screwed to block 82 and may press against rod 83 to provide friction. Rod 83 may be of circular or rectangular cross section, but if round, a suitable key 83a and keyway in the block will be used to prevent block 82 from turning.

Figure 3:
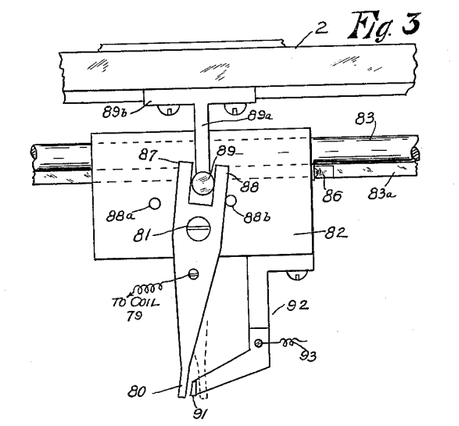
FIGURE 3 is an enlarged front elevation of a direction-sensing switch as used in the backlash compensation system of FIGURE 1.
Figure 5:
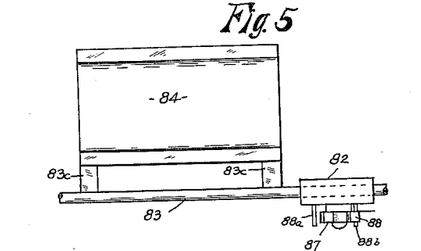
FIGURE 5 is a top plan view showing the mounting of the switch-supporting rod shown in a fragmentary manner in FIGURE 3.

Contact arm 80 is integral with yoke arms 87 and 88 positioned closely to either side of a lug 89 attached to the under surface of table 2, although it may be attached to this table elsewhere. This lug is either made of insulating material such as porcelain, plastic, or glass or is suitably insulated from the table if made of metal. It may be attached to the table by screws passing through feet 89b and should be of rigid construction. A narrow contact 91, made of metal or other conductor, projects forward from a metal arm 92 attached to the lower surface of block 82. In this way the tip of contact arm 80 may wipe across contact 91. Arm 76 of relay 26 similarly wipes across contact 63. Rod 83 is mounted sufficiently forward of saddle 84, on brackets if necessary, so that block 82 will be slidable on the whole working length of the rod regardless of the position of saddle 84 relative to the dovetails of knee 85. FIGURE 5 shows brackets 83c attached to the saddle of the machine, supporting rod 83. Flexible conductor 93 connects arm 92 and integral contact 91 with terminal 65a which is connected with power terminal 65. The flexible connections to contact arm 80 and arm 92 may, of course, be replaced, if desired, by fixed contact rails and sliding brushes.

The construction of elements 80, 81, 87, 88, 89 and associated switch parts should be rugged so that errors will not be introduced as a result of bending or yielding of the metal or other material. Pivot 81 may comprise a sturdy shoulder screw which is screwed into a threaded hole in block 82. Stops 88a and 88b may comprise heavy pins which may be pressed, molded, or screwed into block 82. This block may be molded or otherwise constructed of Bakelite, metal or other material. If made of metal the contacts 80 and 91—92 should be insulated from the block 82. It is obvious that stops 88a and 88b may be made adjustable in position, and screws may be threaded through holes in yoke arms 87 and 88 to provide adjustment in the lost motion between lug 89 and the yoke. It is desirable to make this lost motion very small or virtually non-existent.

The end of lug 89 is preferably rounded so that a smooth sliding contact with the yoke arms can be obtained without binding. The lug may be reduced in width, forming a web portion 89a. This construction prevents binding. The end portion may be a ball, or cylinder or of other curvature. It is preferable that the slack between element 89 and the yoke arms remain more or less constant regardless of the relative position of lug 89 and yoke arms 87 and 88.

Figure 4:
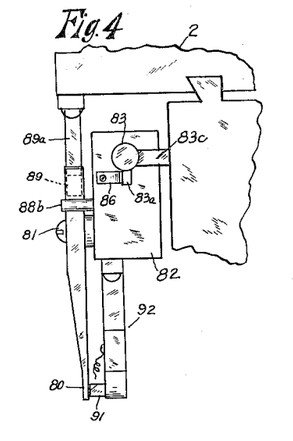
FIGURE 4 is an end view, as seen from the right of the switch members shown in FIGURE 3.

Spring 86 may press against rod 83 or against key 83a. This spring should provide sufficient friction to insure that element 89 will rotate arm 80 about pivot 81 before block 82 is moved. In FIGURE 4, spring 86 is shown attached to block 82 and pressing against key 83a extending from rod 83. FIGURE 5 shows rod 83 mounted on spacer blocks 83c located at the ends of saddle 84. The rod and blocks are fastened to the saddle by means of screws or bolts.

An important feature of the backlash switch construction is that the narrow tip of switch arm 80 can be moved through a much greater distance than the tolerance desired. In fact it is not essential that the tip be narrow but this construction reduces the necessary arcuate movement of the switch arm or blade 80. In FIGURE 3 the element 89 is indicated as traveling to the right and it has pushed yoke arm 88 against stop 88b. The separation between the right edge of element 80 and the left edge of contact 91 can be 0.001 inch, 0.010 inch or any reasonable value desired. The spacing should be sufficient to insure that switch arm 80 does not touch contact 91 until element 89 begins to move in reverse direction or to the left in FIGURE 3. If the separation is 0.005 inch, for instance, and if the effective distance of element 89 from pivot 81 is $\frac{1}{10}$ the effective distance of contact 91 from the pivot, then a reverse movement of table 2 and element 89 of 0.0005 inch will cause the tip of switch member 80 to be brought into contact with element 91, which will cause backlash take-up as described. Element 89 can be closely fitted between yoke arms 87 and 88, or a spring may urge arm 80 toward a neutral or in-contact position. By this means yoke arm 87 or 88 will be made to follow the movement of element 89 for either direction.

Assuming that the parts are in the relative positions shown and that element 89 is being carried to the right by table 2, then switch arm 80 will be swung about pivot 81 by element 89 and will be brought into contact with switch element 91 when table 2 moves approximately 0.0005 inch in the reverse or left direction since friction of spring 86 holds block 82 temporarily stationary, thereby causing backlash compensation as described. Further, leftward movement of table 2 and element 89 will cause switch arm 80 to wipe across contact 91 and to be halted by stop 88a when the left edge of arm 80 is approximately 0.005 inch beyond the right edge of contact 91. The element 89 finally slides block 82 along rod 83, against friction of spring 86. Again, upon reversal of direction of movement of table 2, element 89 will quickly bring arm 80 into contact with switch element 91 and across it, and backlash compensation will again be effected in manner described. The ratio of the effective distance of contact 91 from pivot 81 to the effective distance of the rounded end of element 89 need not be 10:1 as mentioned but can be other values. The higher the ratio the greater can be the separation of element 80 from contact 91, for the two extreme positions of element 80, considering the same degree of backlash compensation. In operation, this system has worked well. The switch arm 80 may be resilient so that it will press against contact 91 as it slides over it and a plastic or other surface flush with the working surface of the contact may be provided if desired.

The cathode of photocell 47 is connected to the positive pole of bias battery 39, the cathode of photocell 48 is connected to the positive pole of bias battery 40 and the cathode of photocell 49 is connected to the positive pole of bias battery 41. Since the negative pole of battery 45 is connected to contact 44, the photocells will have potential across them only when relay arm 58 is in contact with element 44.

A tape 94 is provided, opaque except for small areas in rows 95, 96, 97 and 98, 99, 100 which are punched holes, transparent material or translucent material, as desired. These holes or windows are arranged in parallel rows and are staggered as indicated, so that if the tape is moving in the direction of the arrow a window 95 will first momentarily come into alignment with photocell 48, and after that a window 97 will momentarily come into alignment with photocell 49. When these photocells are illuminated in the order named, from a showcase type lamp above them (not shown) the grids of thyratrons 9, 10, and 11 are made consecutively positive as a result of sequential current flow through the photocells and associated grid resistors so that these thyratrons are fired in that order, one tube being extinguished by an anode-connected condenser when another is fired. This results in forward rotation of motor M1.

Tape 94 is driven by a drive roller 101 having guide flanges 102. The shaft or axle 103 of this roller is rotatable in bearings in parallel plates 104 and 105 attached to a base 106 which also has attached ends 107 and 108, forming a box. A suitable cover plate 109 is placed between the photocells and tape 94 and holes in the cover plate are aligned with the cathodes of the photocells. The cover plate serves as a light guard, except for the windows, and also supports the tape which ordinarily blocks light from the lamp from striking the photocells. Suitable partitions between the photocells prevent light from any one window from striking any photocell other than the one associated with that window. A second roller 110 is rotatably and movably supported by arms 111 which are pivoted to plates 104 and 105 so that the weight of the roller 110 or suitable springs, will cause the roller to press the tape against drive roller 101. Shaft 103 of roller 110 is driven at suitable speed by a motor 112 fastened to plate 105. A roll 113 of punched, printed, or photographed tape is rotatable about a shaft 114 supported by plates 104 and 105.

A spindle 115 for holding a cutting tool is rotatable in a head 116 being driven by a keyed pulley 117 in conjunction with a belt 118 and a motor driven pulley 119. The spindle is raised or lowered by a gear system including gear 120 which is meshed with gear 121 on the shaft of a step motor M2 which is similar to motor M1. Positive line 20a is connected to the three field windings of motor M2 and to positive line 20. Conductors 122, 123 and 124 connect the other ends of the field windings of motor M2 with the anodes of thyratrons in a box 125 which houses circuits for motors M2 and M3 similar to the circuits shown for motor M1. Conductors 126 and 127 leading from motor M2 to box 125 serve the same purpose as conductors 72 and 75. Conductors 128, 129 and 130 are connected with the cathodes of phototubes 51, 52 and 53 and serve similar purposes as conductors 39a, 40a and 41a connected to the cathodes of phototubes 47, 48 and 49. The cathode of phototube 50 is connected to conductor 131, similarly to conductor 70a and conductor 132 is connected to a current source similar to battery 45.

Step motor M3 is similarly connected to positive line 20b which is connected with positive line 20, and is connected to the circuit in box 125 in similar manner to motor M2. Likewise, conductors 133, 134 and 135 are connected to the cathodes of thyratrons 55, 56 and 57. The cathode of phototube 54 is connected to conductor 136 and conductor 137 is connected to a battery or current source similar to battery 45. Motor M3 drives the saddle 84 back and forth on knee 85 by means of meshed gears 139 and 140 and other suitable gearing. This motor is attached to knee 85 by means of a bracket 141.

Figure 2:
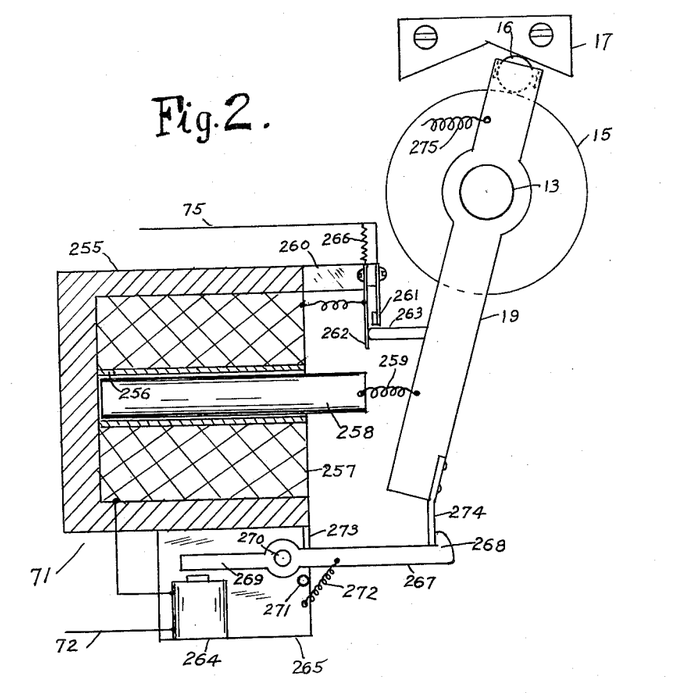
FIGURE 2 is an elevation with parts in section of a latching solenoid which may be used with the motor brake indicated in FIGURE 1, the partial section being made by a plane passing through disc 15 of motor $M_1$ and perpendicular to the axis of that motor.

In FIGURE 2, showing details of a latching solenoid which may be employed with the motor brake of FIGURE 1, like parts are designated by like numerals. Solenoid 71 comprises an outer casing 255 which may be of soft iron and laminated, and an inner brass or other non-magnetic tube 256 around which a magnetizing winding 257 is placed. Tube 256 may be split or may be constructed of non-conductive plastic, fiber, or other similar material in order to reduce eddy currents. A plunger or armature 258 may be laminated for alternating current use and is slidable in the line 256. This plunger is attached to roller-carrying arm 19, preferably by a stiff spring 259. A Bakelite or other insulating block 260 is attached to casing 255 and contact arms 261 and 262 are attached to a projection from block 260 by means of screws. Arm 262 is resilient and is longer than arm 261 so that it can be struck by a rod 263 attached to arm 19. Conductor 75 is connected to contact arm 261 and contact arm 262 is connected to one end of solenoid winding 257, the other end of which is connected to an end of magnet winding 264 mounted on a plate 265 attached to casing 255. The other end of the magnet winding is connected to conductor 72. A resistor 266 bridges contact arms 261 and 262.

A latch arm 267, having hook 268 and a soft iron arm 269 integral or attached thereto, is pivotally attached to plate 265 by a pivot screw 270 and, normally, arm 267 is held against a stop pin 271 by a spring 272 attached to arm 267 and to plate 265. When magnet 264 is energized, arm 269 is pulled toward the magnet which may serve as a stop, or stop 273 may be employed. A rather heavy resilient strip 274, of spring metal or the like, is screwed to arm 19 and is adapted to be engaged by hook 268 when magnet 264 is energized to lift the hook into operative position, and solenoid winding 257 is simultaneously energized to pull plunger 258 into the solenoid. When this happens, stiff spring 259 pulls arm 10 clockwise about shaft 13. If desired, plunger 258 can be arranged to strike the solenoid yoke or casing, spring 259 allowing roller 16 to strike cam 17 before this happens. Resistor 266 is chosen of such resistance that it allows sufficient current to pass through the winding of magnet 264 to maintain arm 267 and hook 268 in the latched position shown, but the resistor does not pass enough current through solenoid winding 257 to cause hum or chattering.

In operation, when conductors 72 and 75 are energized, contacts 261 and 262 short circuit resistor 266 and so full A.C. current passes throught solenoid winding 257 and connected magnet 264 which may be of low impedance Under these conditions the current in the winding of magnet 264 is considerably greater than the minimum necessary to latch arms 267 in operating position. When the solenoid is energized, plunger 258 is magnetically snapped into the solenoid and, due to momentum, rod 263 strikes contact arm 262 and separates this arm from contact element 261 thereby putting resistor 266 into circuit and reducing the current through the solenoid and magnet windings. The magnet still holds arm 269 with hook 268 holding element 274, against tension of spring 275, but the solenoid is weakly energized and so does not hum or chatter. Roller 16 is maintained in contact with one cam surface of element 17 until the current in lines 72 and 75 is cut off. Then magnet 264 is de-energized and spring 272 pulls hook 268 away from element 274 so that spring 275 swings arm 19 counter clockwise about shaft 13 until roller 16 strikes the other working surface of cam 17 which is fastened to the motor. The operation of the brake is as previously described.

This latching type of solenoid has the advantages that it can be latched and released with only one pair of conductors, uses small current when latched, and practically eliminates chatter. The same principles can be applied to a relay or other magnet-operated device. Magnetic element 269 or arm 267 or the equivalent can be attracted to latching position by magnetism from winding 257, eliminating magnet 264 if desired.

In operation, a workpiece 142 is fastened to table 2 and the motor (not shown) driving spindle 115 and cutting tool 143 is connected to an electrical circuit. Marked or punched tape 94 is then driven over the photocells by roll 101 which is rotated to drive the tape to the left by means of motor 112 which is connected to a suitable electrical circuit. This motor can be a synchronous motor or otherwise. Terminals 64 and 65, 64a and 65a, and 64b and 65b are connected to a suitable source of current. Negative terminal 21a is connected to negative line 21 which is connected to the negative terminal of a motor generator, rectifier, or other source of direct current, and lines 20, 20a and 20b are connected to the positive terminal of this source.

As the windows 95, 96 and 97 of the moving belt pass over photocells 47, 48 and 49, in sequence, thyratrons 9, 10 and 11 are fired in sequence so that motor M1 rotates in steps, moving table 2 to the right, for example. While the table is being moved by a screw feed or the like, lug 89 pushes yoke arm 88 to the right bringing contact arm 80 to the left, away from wiper contact 91. The distance of separation of these two contacts can be quite small and, due to the short effective distance of arms 87 and 88 from pivot 81 as compared to the longer pivot distance of the tip of arm 80, a small lateral displacement of table 2 and lug 89 will produce a larger displacement of the contact tip of arm 80. Additional amplifying levers or the like can be used, if desired.

Belt or tape 94 continues to move to the left, causing table 2 to be driven to the right until window 97a admits light to photocell 49, at which time table 2 will be moved its final step to the right. While windows 94, 96, 97 are passing over their respective photocells, the photocell 46 is covered by the opaque tape and so relay coils 70 and 74 are not energized and solenoid 71 is likewise not energized. Therefore, the spring 275 holds arm 19 and roller 16 in a position for forward rotation of the rotor and disc 15, the relay arms 29 and 30 being held against respective contacts 25 and 27 with arm 76 in the position indicated by dotted lines in FIGURE 1. When, however, elongated window 144 passes over photocell 46, which happens soon after window 97a passes photocell 49, relay coil 70 is energized and arm 68 is magnetically brought into contact with element 67 thereby causing current from terminals 64 and 65 to engage relay coil 74 which pulls relay arms 29 and 30 into contact with respective relay contacts 28 and 25, which, in turn, interchanges the grid connections of thyratrons 9 and 11 with respect to commutator brushes 32 and 34; resulting in firing the thyratrons in reverse order to cause reversal of direction of rotation of motor M1. The intermediate thyratron 10 remains connected with brush 33 and therefore is the second tube fired for either direction of rotation, assuming that an end tube is fired first. Commutator 31 is rotated by attached motor 90 which may be synchronous or any other suitable type. When relay 26 is swung over to reverse position, solenoid 71 is simultaneously energized to set roller 16 in position to allow motor M1 to rotate in reverse direction but not forward. Likewise, when relay arm 29 is quickly swung about its pivot, arm 76 brushes over contact 63 to arrive at its position shown, and so momentarily closes the circuit to coil 62 so that relay arm 58 is quickly pulled against contact 42 in which position it is held by latch 60. This causes the negative pole of battery 38 to be connected to negative line 21 so that commutator 31 is effectively connected with the grids of thyratrons 9, 10 and 11 in such order that reverse rotation of motor M1 will result. At the same time, arm 58 is brought away from contact 44, effectively disconnecting the photocells 47, 48 and 49 from control of these thyratrons. Similar circuitry is provided for motors M2 and M3.

It will be noted that relay arm 76 is brushed across contact 63 momentarily, during movement of the relay arms in either direction but arm 76 does not remain in contact with element 63 but is finally held in the position indicated by solid lines when relay coil 74 is energized and is in the position indicated by dotted lines when coil 74 is deenergized and the relay spring is effective.

Commutator 31 is preferably driven continuously and feeds current intermittently to the grids of thyratrons 11, 10 and 9 in that order causing reverse rotation of motor M1 when relay 29—30 is in the position shown. These intermittent currents are of sufficient potential to overcome the negative bias potentials of sources 41, 40 and 39. Motor M1 will continue to rotate in reverse direction, under control of the commutator and taking up backlash in the gearing until table 2 starts to move to the left in a reverse direction. When this happens, lug 89 pushes arm 87 to the left, quickly bringing pivoted arm 80 into contact with wiper contact 91 at which moment coil 79 becomes energized with current from terminals 64a and 65a and latch 60 is pulled back to release relay arm 58. When that happens, the relay spring quickly pulls arm 58 away from contact 42 and against contact 44, resulting in disconnecting commutator 31 from control of thyratrons 9, 10, 11 and connecting the photocells again with the thyratron grids. Motor M1 continues to revolve, moving table 2 to the left and bringing arm 80 out of contact with element 91 finally being moved along the rod. Suitable stops are provided on slide 82 to limit rotation of arms 87 and 88 in either direction about pivot 81. As before, the adjacent edge of arm 80 may be quite close to contact 91 and, if desired, an overcenter spring may be used with arm 80 to cause it to be more stable in either forward or reverse position. It should be noted that contact arm 80 does not remain in contact with element 91 but is momentarily brushed across it for either direction of travel of the table 2 and attached lug 89.

A space is provided on the tape between the last window 97a for forward motor rotation and the first window 97b for reverse motor rotation, except for elongated window 144 which continues until the motor M1 is changed to forward rotation. It will be observed that the angle formed by the transverse series of windows 95, 96 and 97 is oposite to the angle of windows 95b, 96b and 97b. This change in angle reverses the order of firing of the thyratrons and therefore causes reverse rotation, in conjunction with the other reversing means controlled by photocell 46. Actually the first occurring window 97b, as shown, can be omitted since the last window 97a is on the same line and accordingly leaves the associated thyratron in fired condition. The space between the forward and reversing windows is made adequate to allow the commutator to cause the motor to take up all the backlash before the windows 95b, 96b and 97b again cause the table and workpiece to be displaced in accordance with the desired pattern. A tape-making machine such as that described in my U.S. Patent No. 2,781,848 can be arranged automatically to allow blank spaces in the tape upon reversals.

Motor M1 moves table 2 to the left according to the pattern of windows on the tape, the speed of the motor being inversely proportional to the longitudinal spacing of the windows. When table 2 has reached its full travel to the left, the end of window 144 passes over photocell 46 which then receives little or no light so coil 70 is de-energized and relay arm 68 is quickly pulled away from contact 67 by the relay spring. This breaks the circuit to relay coil 74 so that this relay is again set for forward motor direction and solenoid 71 is de-energized, causing the roller brake 16 to be shifted to a position for forward rotation of the rotor of motor M1. Now when relay 26 is set for forward direction of the motor, with arms 29 and 30 against respective contacts 25 and 27, arm 76 is swept back over contact 63 to the out-of-contact dotted line position and coil 62 is again momentarily energized to pull arm 58 against contact 42 in which position it is held by latch 60. Under these conditions photocells 47, 48 and 49 and battery 45 are again effectively disconnected from the grids of thyratrons 9, 10, and 11 and commutator 31 is connected to fire these thyratrons in an order causing forward rotation of motor M1. This causes the screw feed or other gearing to take up the backlash, a blank space being left on tape 94 for this interval. When the backlash has been taken up or compensated, table 2 will start to move to the right and virtually at that moment lug 89 will push yoke arm 88 slightly to the right thereby bringing arm 80 into contact with element 91 and past it. When that occurs, coil 79 will again be energized and latch 60 will be pulled over to release relay arm 58 which is quickly returned to the position shown, in contact with element 44. This effectively removes the commutator and current supply 38 from the grid circuits and reconnects photocells 47, 48 and 49 and their current supply 45. After the moving tape brings the next window 95, 96 or 97 into alignment with the associated photocell, motor M1 again rotates forward according to the window pattern on the tape. The step motor does not rotate after release of relay arm 58 until the next window arrives over its associated photocell. Compensating means can be included to prevent loss of any step in transferring from commutator to tape operation.

Lug 89 moves block 82 along rod 83 by means of one of the yoke arms, for any one direction, after yoke arm 87 or 88 strikes stop 88a or stop 88b. While a simple contact system for detecting movement of the table when direction is reversed is shown, other means can be used. For instance, an electrical generator can be geared or linked to the table and its output employed, or windows admitting light to photocells can be varied by the table movement, or capacitive or magnetic changes can be used instead of the contacts shown. It is obvious that electronic tubes or other amplifiers can be used in the relay circuits if desired.

With the table moving to the right in FIGURE 1, the intelligence slot 144 energizes the slots cell 46 resulting in energizing the motor brake for reverse rotation plus turning on the commutator circuit 31. Lever 88 will indicate backlash takeup by sweeping counterclockwise across contacts 80—91 so as to reinstate the tape circuit through solenoid 79.

At this time, the slope of the intelligence holes 95—97 will have changed to 95b—97b resulting in reverse fire of the thyratrons, namely 11—10—9 and leftward movement of the table 2. Meanwhile, solenoid 70 remains energized to insure energization of motor brake solenoid 71 and reverse solenoid 74. Solenoid 62 is de-energized. Intelligence slot 144 terminates when desired leftward table movement is reached. Then solenoid 70 is de-energized but solenoid 62 is momentarily energized through switch contacts 63 and 76 to reinstate the commutator circuit for backlash takeup. At this time, solenoids 71 and 74 are de-energized resulting in forward fire of the thyratrons, namely 9—10—11. When backlash is taken up, lever 88 will pivot to reinstate the tape circuit.

The present backlash compensating system has the advantage that it automatically compensates for any degree of backlash, which might change from day to day or over any other period, without appreciably affecting the workpiece shaped automatically by the predetermined pattern on the tape. As shown in the drawing the tape includes window patterns for motors M1 and M3, the motor M2 being stationary. It is obvious that similar backlash compensating means can be used in connection with motors M2 and M3 and associated drives. For illustration, rod 83a may be attached to bracket 145, parallel to the axis of spindle 115. This bracket attaches motor M2 to the lower end of head 116. Contact arm 80a is pivoted to block 82a which is slidable on rod 83a. Flange 89a attached to spindle 115 serves to operate the yoke of contact arm 80a in the same manner that lug 89 operates the yoke of contact arm 80. The contacts are connected into a circuit in box 125, similar to the circuit described in connection with contacts 80 and 91. Similarly, a rod can be attached to knee 85 and a contact slide on the rod can be moved by a lug attached to saddle 84.

Many changes of detail can be made without departing from the general principles I have disclosed. For instance, a relaxation oscillator or other pulsing device can be substituted for commutator 31 and, microswitches or the like can be used in place of switch 91—92. Likewise, other relay arrangements can be employed instead of the latching relay in FIGURE 1.

This application is a continuation of copending application Serial No. 436,653, filed June 14, 1954, now abandoned.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a device having a movable member, power feed means subject to back-lash coupled to said movable member for alternately moving it in opposite directions, drive means operatively connected to actuate said feed means, control means coupled to said drive means for controlling the movement of said member, first means responsive to a reversing signal from said control means for disconnecting said control means from said drive means, and second means responsive to movement of said member after take up of back-lash in said feed means for reconnecting said control means to said drive means.

2. In a device having a movable member, a mechanism for moving said member, said mechanism being subject to back-lash, electrical drive means coupled to said mechanism for imparting movement to said mechanism in either of two directions, current control means coupled to said electrical drive means to energize said drive means to move said mechanism and said member in a first direction, record means coupled to said current control means for controlling the operation of said current control means according to characteristics of said record means, other electrical means coupled to said current control means for controlling said current control means to move said mechanism, first means coupled to said record means for activating said current control means in response to a signal from said record means to reverse the direction of movement of said mechanism, second means coupled to said record means and responsive to said signal for connecting said other electrical means to said current control means and disconnecting said record means from said current control means, and means coupled to said movable member and responsive to movement of said member in a second direction after take-up of back-lash in said mechanism for disconnecting said other electrical means from said current control means and reconnecting said record means to said current control means.

3. The device as described in claim 2 in which said responsive means coupled to said movable member include switch means having a movable wiper contact actuated by movement of said member upon reversal thereof to momentarily close a circuit.

4. In a device having a movable member, electromagnetic drive means coupled thereto for moving said member, an electrical control circuit connected to said electromagnetic means to control the operation thereof, switch means connected to said movable member, connecting circuit means coupling said switch means to said electrical control circuit to modify the operation thereof in accordance with the operation of said switch means, said switch means including a movable wiper contact responsive to movement of said member for momentarily closing said connecting circuit means upon a change in direction of movement of said member.

5. The device as described in claim 4, said electromagnetic means comprising a step motor having means to prevent rotation of the rotor of said motor through more than a fraction of a step in one direction while allowing substantially free rotation of said rotor in the opposite direction.

6. In a device having a movable member and a base, electromagnetic means coupled thereto for moving said member, electrical circuit means connected to said electromagnetic means for controlling the operation thereof, a track element supported by said base, switch means coupled to said member and movably supported along said track element, other means coupled to said switch means and track element for resisting movement of said switch means along said track during movement of said member, said switch means including a movable wiper contact actuated by a reversal in direction of movement of said member, for momentarily closing an energizing circuit to said electrical circuit means.

7. In a device having a movable member, a motor coupled thereto for moving said member, first electrical circuit means connected to said motor for controlling the operation thereof, a track element, switch means movable with respect to said track element in response to movement of said member including means for resisting movement between said switch means and track element, means connecting said switch means on said track element for operating said switch means upon reversal of direction of movement of said member, second electrical circuit means coupled to and controlling said first electrical circuit means, third electrical circuit means coupled to and controlling said first electrical circuit means, and means coupling said switch means to said second and third circuit means to connect said second circuit means to said first circuit means and substantially simultaneously to disconnect said third circuit means from said first circuit means upon operation of said switch means.

8. The device as described in claim 7, said switch means including a pivoted contact carrying switch arm, a second contact, and a yoke member integral with said switch arm and driven by said member about said pivot to wipe said switch arm across said second contact for both directions of movement of said member.

9. In a device having a movable member, mechanical means coupled thereto for moving said member, a step motor for actuating said mechanical means, a motor control circuit connected to said motor, reversing relay means connected to said motor control circuit for reversing connections thereof to reverse its direction of rotation, electrical pulsing means connected to said reversing relay means for supplying intermittent electrical currents to said motor control circuit, a record, means for sensing information on said record, electrical circuit means coupling said sensing means to said motor control circuit and including other relay means for disconnecting said sensing means from said motor control circuit and for connecting said electrical pulsing means to said motor control circuit, means actuating said reversing relay means upon reversal of direction of rotation of said motor, and means responsive to movement of said member and coupled to said other relay means to cause operation thereof to connect said sensing means with said motor control circuit and to disconnect said pulsing means therefrom upon movement of said member after back-lash in said mechanical means is taken up.

10. The device as described in claim 9, said motor including means for restricting rotation thereof to less than one step in one direction while allowing substantially free rotation in the opposite direction, means including electromagnetic means for reversing the effective direction of said restricting means, and means for energizing said electromagnetic means substantially simultaneously with energization of said reversing relay means.

11. In a device having a movable member, mechanical means connected with said member to cause movement thereof, a step motor mechanically connected to said mechanical means, electrical circuit means connected to said step motor for causing rotation thereof and including means for reversing its direction of rotation, record means, means for sensing information on said record means, electrical means coupling said sensing means to said electrical circuit means for rotating said motor in accordance with sensings of said record means, other electrical means coupled to said electrical circuit means for rotating said motor; means for electrically connecting and disconnecting said electrical circuit means and said other electrical means and said sensing means, said connecting and disconnecting means upon reversal of said motor connecting said other electrical means electrically with said electrical circuit means and electrically disconnecting said electrical circuit means and said sensing means so that said motor will be energized by said other electrical means to drive said mechanical means to take up back-lash therein, and means responsive to movement of said member actuating said connecting and disconnecting means to disconnect said electrical circuit means and said other electrical means and to connect said electrical circuit means and said sensing means after back-lash is taken up.

12. The device as described in claim 11, and including means controlled by said record for reversing said motor.

13. The device as described in claim 11, said other electrical means including a relay for reversing said motor, and said means responsive to movement of said member including a latching relay, said reversing relay having switch means for latching said latching relay when said reversing relay is operated, said means responsive to movement of said member including means for releasing said latching relay upon movement of said member after reversal of direction of movement thereof.

14. In a device, a movable member, mechanical means coupled thereto for moving said member, electromagnetic drive means coupled to said mechanical means, record means, means for sensing information on said record means, electrical means coupling said sensing means and said electromagnetic drive means to effect control of said drive means in accordance with sensings of said record means, other electrical means for controlling said electromagnetic drive means coupled thereto, said electrical means including means for disconnecting said sensing means from said electromagnetic drive means just before reversal of direction of movement thereof and for connecting said other electrical means and said electromagnetic drive means to energize said electromagnetic drive means to take up back-lash in said mechanical means, and means responsive to movement of said member for connecting said sensing means to said electromagnetic drive means and for disconnecting said electromagnetic drive means and said other electrical means upon movement of said member.

15. In a device, a movable member, mechanical means coupled thereto for moving said member, a motor coupled to said mechanical means for driving said mechanical means, means for controlling current supplied to said motor according to a predetermined program, means for reversing the direction of rotation of said motor, other means controlling current supplied to said motor after reversal thereof to take up back-lash in said mechanical means, means coupled to said reversing means for actuating said current controlling means and for actuating said other current controlling means, and means responsive to movement of said member for actuating said current control means and for activating said other current control means after said back-lash is taken up.

16. In an electro-mechanical system, a movable member, mechanical means connected thereto for moving said member, a motor connected to said mechanical means for driving said mechanical means, a tape having characteristics for controlling said motor, means for sensing said characteristics, current control means connected to said sensing means and said motor and controlled by said sensing means, other current control means for controlling current supplied to said motor, means for reversing the direction of rotation of said motor, means coupled to said reversing means for activating said sensing means and for activating said other current control means upon reversal of said motor to cause rotation thereof until back-lash in said mechanical means is taken up, and means responsive to movement of said member for restoring said sensing means and for activating said other current control means.

17. In the system as described in claim 16, means for moving said tape, said tape having space between group characteristics causing rotation of the motor in one direction and group characteristics causing rotation of the motor in the opposite direction, said reversing means and said other current control means being activated during sensing of said space by said sensing means, and said current control means being activated immediately after sensing of the next succeeding characteristic of a group moving toward said sensing means after passage of said space thereby.

18. The method of compensating for back-lash in a power drive system, said method comprising controlling said power drive by a principal control until change of direction of movement of said drive occurs, making said principal control ineffective upon said change of direction and making an auxiliary control for said drive effective to take-up back-lash in said drive, and subsequently making said auxiliary control ineffective and said principal control effective as a result of movement of a member actuated by said power drive.

References Cited in the file of this patent
UNITED STATES PATENTS

| | | |
|---|---|---|
| 2,224,257 | Eisele | Dec. 10, 1940 |
| 2,375,074 | Carlson | May 1, 1945 |
| 2,698,888 | Coe | Jan. 4, 1955 |
| 2,749,812 | Wetzel | June 12, 1956 |
| 2,751,460 | Petersen | June 19, 1956 |
| 2,755,422 | Livingston | July 17, 1956 |
| 2,820,187 | Parson et al. | Jan. 14, 1958 |
| 2,916,931 | Cunningham | Dec. 15, 1959 |